US012801081B2

(12) United States Patent
Takifuji

(10) Patent No.: US 12,801,081 B2
(45) Date of Patent: Nov. 17, 2026

(54) IMAGE FORMING APPARATUS

(71) Applicant: BROTHER KOGYO KABUSHIKI KAISHA, Nagoya (JP)

(72) Inventor: Kotaro Takifuji, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 19/022,742

(22) Filed: Jan. 15, 2025

(65) Prior Publication Data

US 2025/0298365 A1 Sep. 25, 2025

(30) Foreign Application Priority Data

Mar. 19, 2024 (JP) ................................ 2024-043080

(51) Int. Cl.
*G03G 21/16* (2006.01)

(52) U.S. Cl.
CPC ................................ *G03G 21/1619* (2013.01)

(58) Field of Classification Search
CPC ................................................ G03G 21/1619
See application file for complete search history.

(56) References Cited

U.S. PATENT DOCUMENTS

2005/0062836 A1* 3/2005 Nakajima ............ G03G 15/011 347/225
2007/0146738 A1* 6/2007 Nakajima ............ G03G 15/011 358/1.7
2007/0160382 A1* 7/2007 Tomatsu ............ G03G 21/1619 399/121
2009/0323147 A1* 12/2009 Amada ................ G03G 15/326 359/205.1
2010/0014887 A1* 1/2010 Tomatsu ............ G03G 21/1864 399/107
2010/0060710 A1* 3/2010 Kubo ............... G03G 15/04072 362/259
2015/0220047 A1* 8/2015 Suzuki ............... G03G 21/1619 29/505
2016/0274530 A1* 9/2016 Tanabe ............... G03G 21/1619
2022/0075311 A1* 3/2022 Kobayashi ............. G03G 15/00

FOREIGN PATENT DOCUMENTS

JP H11-34392 A 2/1999

* cited by examiner

*Primary Examiner* — Sevan A Aydin
(74) *Attorney, Agent, or Firm* — Merchant & Gould P.C.

(57) ABSTRACT

An image forming apparatus includes paired main-body frames and a scanner frame. The canner frame, on which an exposure device is mounted, is connected to one and the other of the paired main-body frames and includes a bottom plate, a first wall plate, a second wall plate, a third wall plate, a fourth wall plate, a first auxiliary plate, a second auxiliary plate, a third auxiliary plate, and a fourth auxiliary plate. The first wall plate, the first auxiliary plate, and the third auxiliary plate are screwed to the one of the paired main-body frames, and the second wall plate, the second auxiliary plate, and the fourth auxiliary plate are screwed to the other of the paired main-body frames.

5 Claims, 7 Drawing Sheets

IMAGE FORMING APPARATUS

REFERENCE TO RELATED APPLICATIONS

This application claims priority from Japanese Patent Application No. 2024-043080, filed on Mar. 19, 2024. The entire content of the priority application is incorporated herein by reference.

BACKGROUND ART

An image forming apparatus may have an optical box to accommodate an optical device with a lid member, and the optical box may be attached to a main body frame of the image forming apparatus with the lid member being screwed from above.

SUMMARY

The known structure may support the optical box preferably as long as the lid member of the optical box is substantially rigid. However, in a case where the lid member with reduced rigidity is provided for some reasons such as cost reduction, the main body frame, to which the lid member is screwed from above, may not provide substantial rigidity as a whole against a force in a horizontal direction.

The present disclosure relates to a technique that may improve rigidity of a framework, including a less rigid scanner frame, against a force in a horizontal direction.

According to an aspect of the present disclosure, an image forming apparatus includes a paired main-body frames and a scanner frame. The paired main-body frames form side walls of a main body that face each other. The scanner frame, on which an exposure device for irradiating a photosensitive drum is mounted, is connected to one of the paired main-body frames and the other of the paired main-body frames at a position between the one of the paired main-body frames and the other of the paired main-body frames. The scanner frame includes a bottom plate, a first wall plate, a second wall plate, a third wall plate, a fourth wall plate, a first auxiliary plate, a second auxiliary plate, a third auxiliary plate, and a fourth auxiliary plate. The bottom plate extends in a horizontal direction between the one of the paired main-body frames and the other of the paired main-body frames and includes a first edge portion located on a side toward the one of the paired main-body frames, a second edge portion located on a side toward the other of the paired main-body frames, a third edge portion joining the first edge portion and the second edge portion, and a fourth edge portion located on a side opposite to the third edge portion. The first wall plate extends in a vertical direction from the first edge portion of the bottom plate. The second wall plate extends in the vertical direction from the second edge portion of the bottom plate. The third wall plate extends in the vertical direction from the third edge portion of the bottom plate. The fourth wall plate extends in the vertical direction from the fourth edge portion of the bottom plate. The first auxiliary plate is formed by being bent to extend in parallel to the first wall plate from an edge portion of the third wall plate on the side toward the one of the paired-main body frames. The second auxiliary plate is formed by being bent to extend in parallel to the second wall plate from an edge portion of the third wall plate on the side toward the other of the paired main-body frames. The third auxiliary plate is formed by being bent to extend in parallel to the first wall plate from an edge portion of the fourth wall plate on the side toward the one of the paired main-body frames. The fourth auxiliary plate is formed by being bent to extend in parallel to the second wall plate from an edge portion of the fourth wall plate on the side toward the other of the paired main-body frames. The first wall plate, the first auxiliary plate, and the third auxiliary plate are screwed to the one of the paired main-body frames. The second wall plate, the second auxiliary plate, and the fourth auxiliary plate are screwed to the other of the paired main-body frames.

DESCRIPTION

Hereinbelow, an embodiment of the present disclosure will be described with reference to the accompanying drawings. In the accompanying drawings referred to below, some of basic components in a color laser printer 1 may be omitted, and dimensional ratios of the depicted components may not necessarily correspond to those in life-size. Bidirectional arrows D1, D2, D3 in FIGS. 1-7 indicate a front-rear direction, an up-down direction, and a right-left direction, respectively, within the color laser printer 1.

Figure 1:
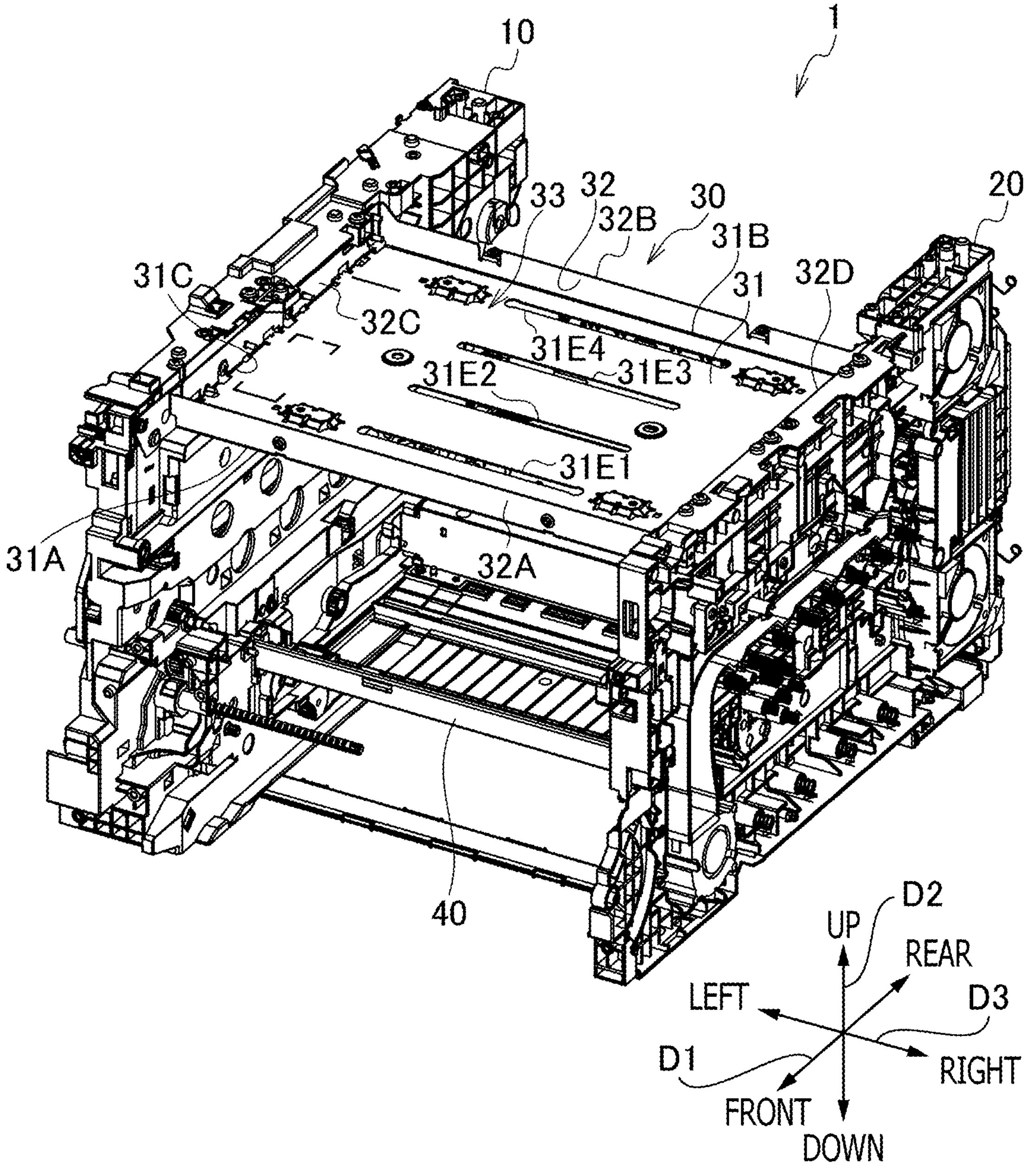
FIG. 1 is a perspective view of inner frames of a color laser printer.

FIG. 1 is a perspective view of inner frames in the color laser printer 1. The color laser printer 1 is an example of the image forming apparatus according to the embodiment of the present disclosure. In the description below, the color laser printer 1 may simply be referred to as a printer 1. As shown in FIG. 1, in the printer 1, a pair of main-body frames 10, 20, which form side walls of a main body, stand to face each other. One of the paired main-body frames 10, 20 forming a leftward side wall will be herein referred to as a leftward body frame 10, and the other of the paired main-body frames 10, 20 forming a rightward side wall will be herein referred to as a rightward body frame 20. The leftward body frame 10 is an example of the one of the paired main-body frames, and the rightward body frame 20 is an example of the other of the paired main-body frame. Both the leftward body frame 10 and the rightward body frame 20 may be formed of, for example, resin.

The printer 1 includes a scanner frame 30 connected to the leftward body frame 10 and the rightward body frame 20 at a position between the leftward body frame 10 and the rightward body frame 20. On the scanner frame 30, an exposure device (not shown) for irradiating four photosensitive drums (not shown) is mounted. The photosensitive drums may correspond to four colors of, for example, yellow, magenta, cyan, and black on one-to-one basis. The scanner frame 30 includes a bottom plate 31, extending in a rectangular shape between the leftward body frame 10 and the rightward body frame 20, and wall plates 32, surrounding the bottom plate 31, which form a top-open box with an upward surface 33 being exposed. The wall plates 32 include a frontward wall plate 32A, a rearward wall plate 32B, a leftward wall plate 32C, and a rightward wall plate 32D.

The frontward wall plate 32A extends to stand vertically from a frontward edge portion 31A of the bottom plate 31, in other words, stands upward along the up-down direction D2. The rearward wall plate 32B extends to stand vertically from a rearward edge portion 31B, which is on the opposite side to the frontward edge portion 31A, of the bottom plate 31. The leftward wall plate 32C extends to stand vertically from a leftward edge portion 31C of the bottom plate 31. The rightward wall plate 32D extends to stand vertically from a rightward edge portion 31D (see FIG. 4) of the bottom plate 31. The leftward edge portion 31C is an example of the first edge portion, the rightward edge portion 31D is an example of the second edge portion, the frontward edge portion 31A is an example of the third edge portion, and the rearward edge portion 31B is an example of the fourth edge portion. The leftward wall plate 32C is an example of the first wall plate, the rightward wall plate 32D is an example of the second wall plate, the frontward wall plate 32A is an example of the third wall plate, and the rearward wall plate 32B is an example of the fourth wall plate.

In the bottom plate 31 of the scanner frame 30, four slits 31E1-31E4 are formed. The exposure device mounted on the scanner frame 30 may emit light beams at the photosensitive drums located below the bottom plate 31 through the slits 31E1-31E4 to irradiate surfaces of the photosensitive drums.

The printer 1 further includes an enhancing frame 40 connected to the leftward body frame 10 and the rightward body frame 20, at a position between the leftward body frame 10 and the rightward body frame 20 below the bottom plate 31. The enhancing frame 40 is formed to have an L-shaped cross section (see FIG. 7).

Figure 2:
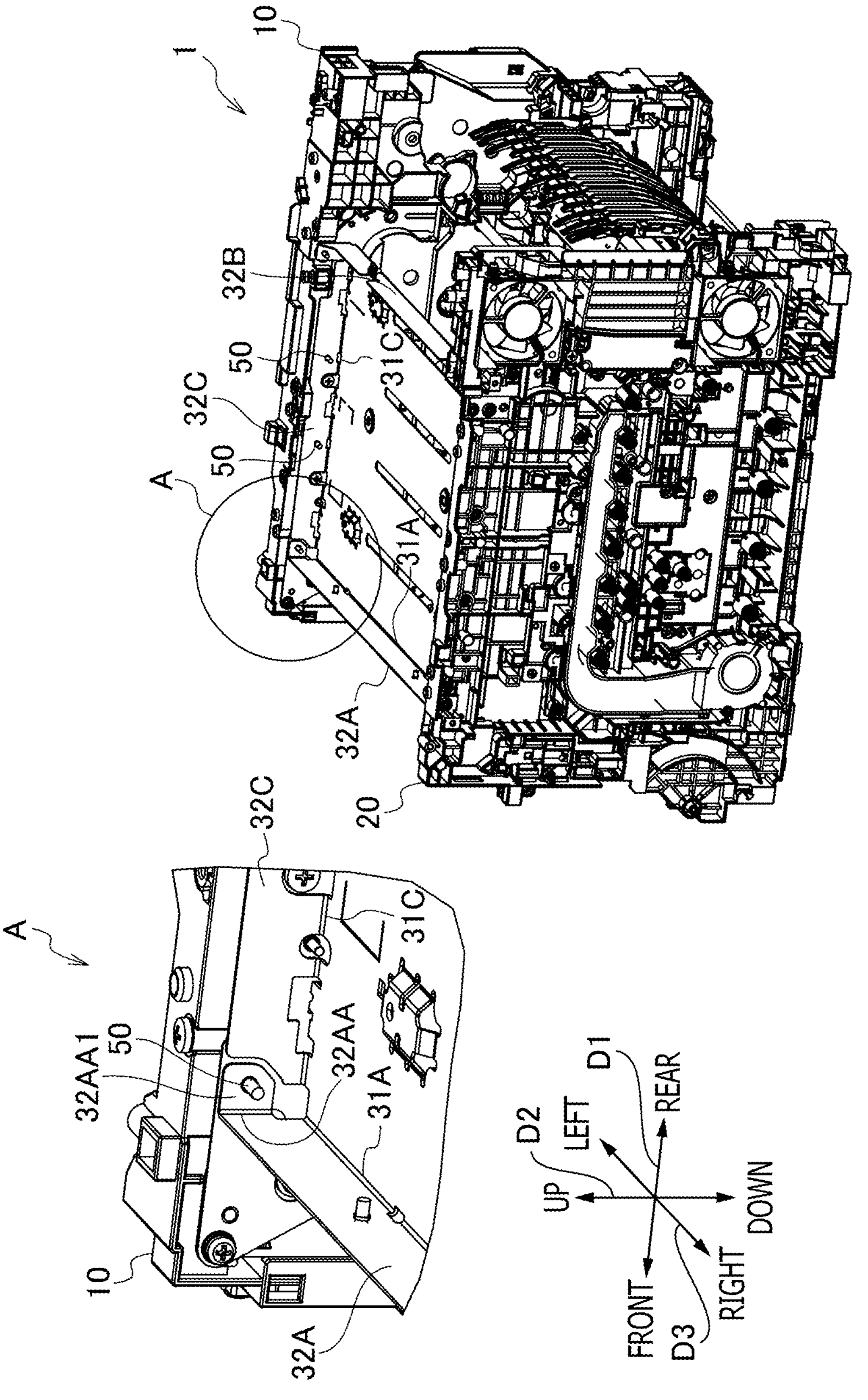
FIG. 2 is a perspective view and an enlarged view of an area A of the inner frames of the color laser printer.

FIG. 2 shows a perspective view of the inner frames of the color laser printer 1 and an enlarged view of an area A, in which the frontward edge portion 31A and the leftward edge portion 31C of the bottom plate 31 join each other. As shown in FIG. 2, the frontward wall plate 32A includes a first auxiliary plate 32AA1, which is bent rearward to extend in parallel to the leftward wall plate 32C from a leftward edge portion 32AA of the frontward wall plate 32A. In other words, the first auxiliary plate 32AA1 is bent toward the leftward wall plate 32C.

Figure 4:
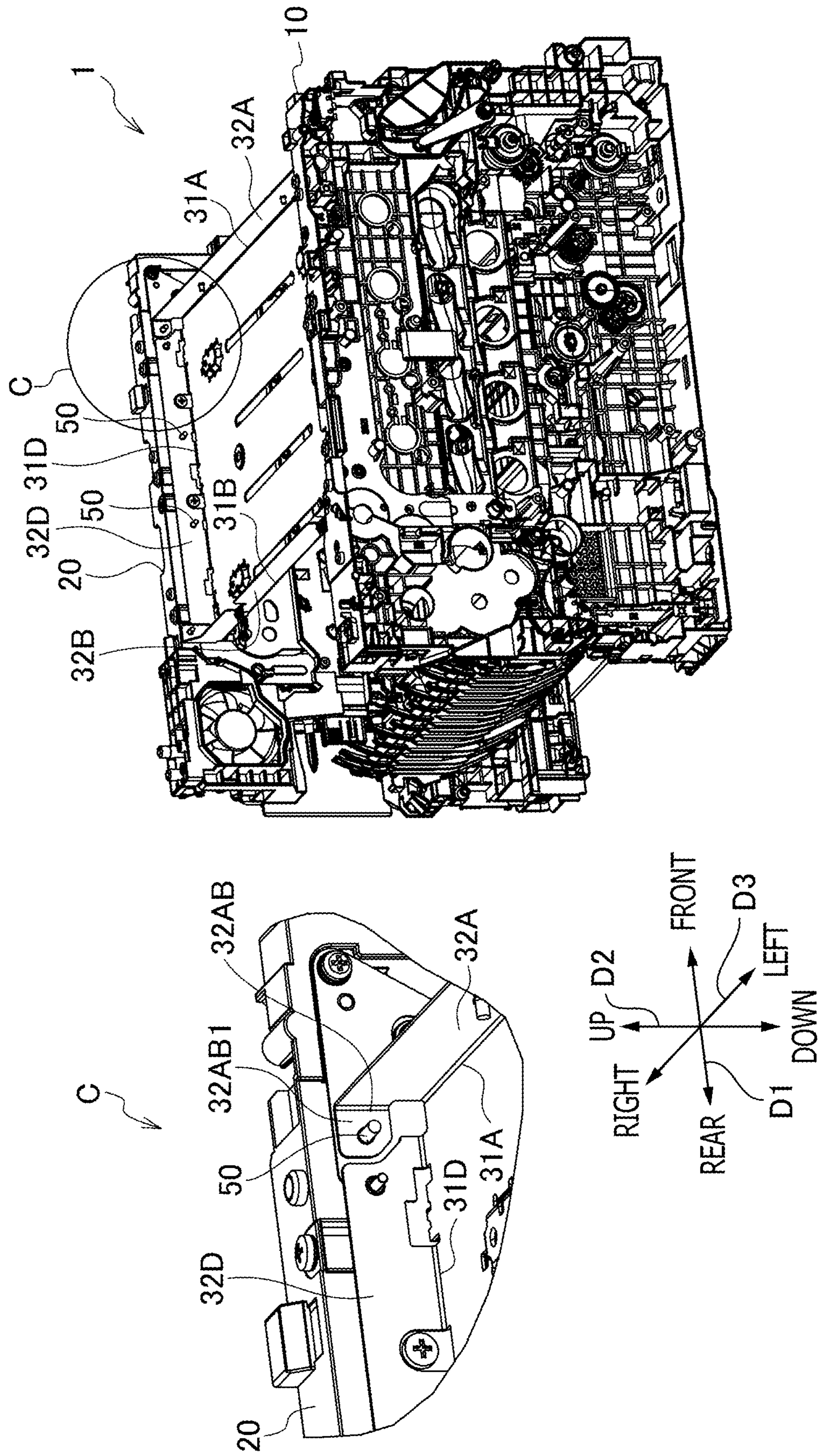
FIG. 4 is a perspective view and an enlarged view of an area C of the inner frames of the color laser printer.

FIG. 4 shows a perspective view of the inner frames of the color laser printer 1 and an enlarged view of an area C, in which the frontward edge portion 31A and the rightward edge portion 31D of the bottom plate 31 join each other. As shown in FIG. 4, a second auxiliary plate 32AB1, which is bent rearward to extend in parallel to the rightward wall plate 32D from a rightward edge portion 32AB of the frontward wall plate 32A. In other words, the second auxiliary plate 32AB1 is bent toward the rightward wall plate 32D.

Figure 3:
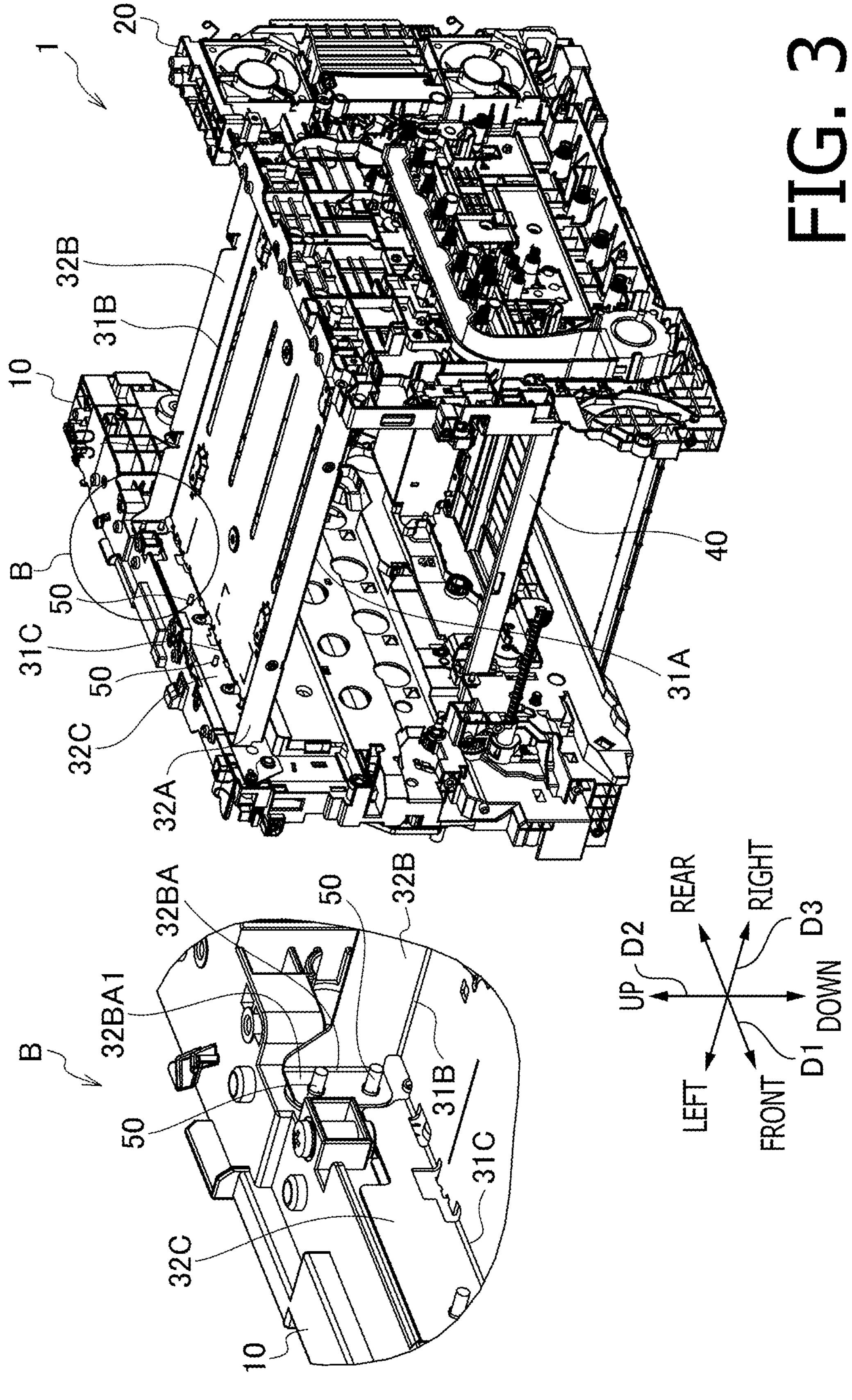
FIG. 3 is a perspective view and an enlarged view of an area B of the inner frames of the color laser printer.

FIG. 3 shows a perspective view of the inner frames of the color laser printer 1 and an enlarged view of an area B, in which the rearward edge portion 31B and the leftward edge portion 31C of the bottom plate 31 join each other. As shown in FIG. 3, a third auxiliary plate 32BA1, which is bent frontward to extend in parallel to the leftward wall plate 32C from the leftward edge portion 32BA of the rearward wall plate 32B. In other words, the third auxiliary plate 32BA1 is bent toward the leftward wall plate 32C.

Figure 5:
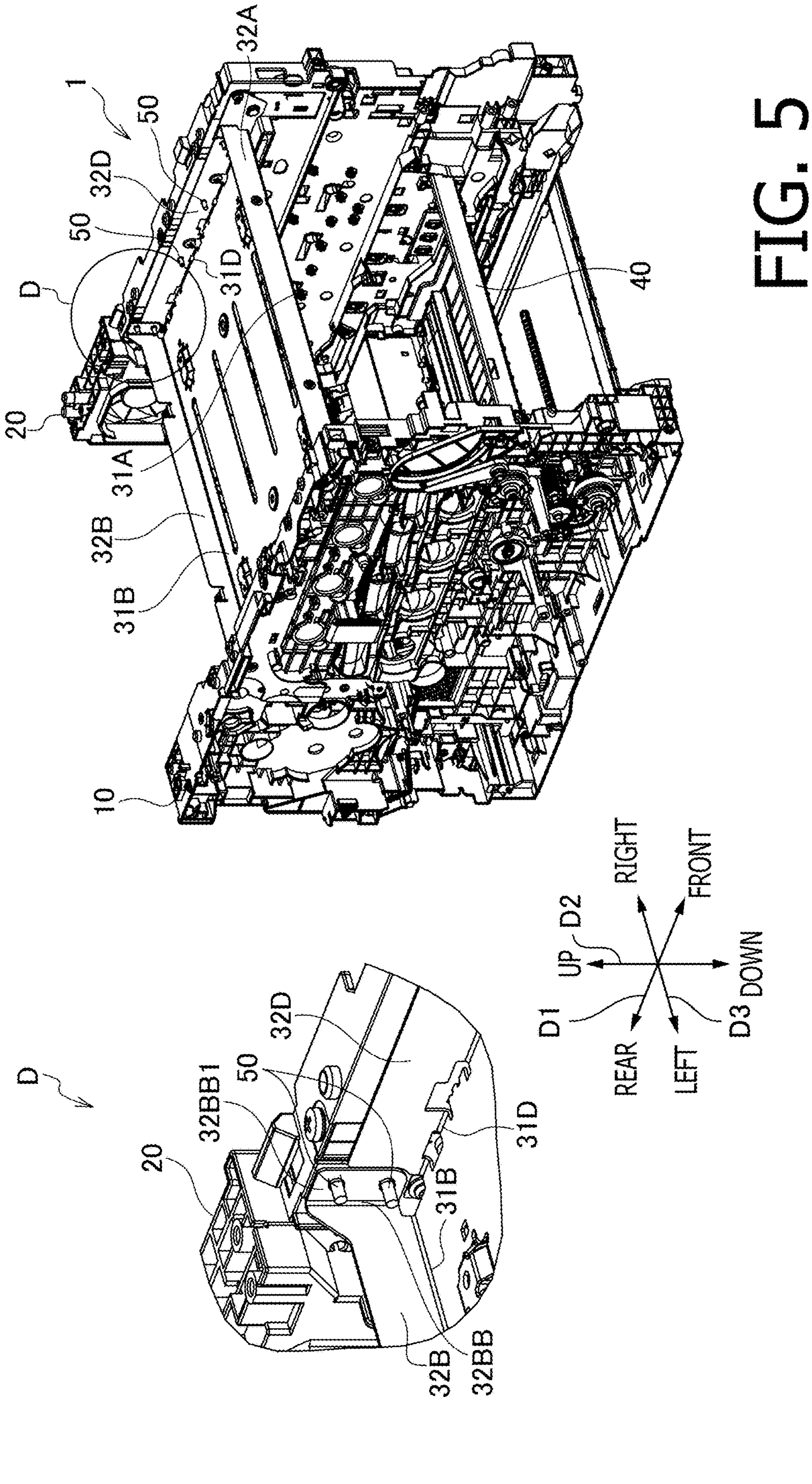
FIG. 5 is a perspective view and an enlarged view of an area D of the inner frames of the color laser printer.

FIG. 5 shows a perspective view of the inner frames of the color laser printer 1 and an enlarged view of an area D, in which the rearward edge portion 31B and the rightward edge portion 31D of the bottom plate 31 join each other. As shown in FIG. 5, a fourth auxiliary plate 32BB1, which is bent frontward to extend in parallel to the rightward wall plate 32D from the rightward edge portion 32BB of the rearward wall plate 32B. In other words, the fourth auxiliary plate 32BB1 is bent toward the rightward wall plate 32D.

For attaching the scanner frame 30 the main-body frames 10, 20 to extend between the leftward body frame 10 and the rightward body frame 20, as shown in FIGS. 2-5, the leftward wall plate 32C, the first auxiliary plate 32AA1, and the third auxiliary plate 32BA1 are screwed to an inner side of the leftward body frame 10 at an upper position with screws 50 from outside toward inside of the leftward body frame 10, and the rightward wall plate 32D, the second auxiliary plate 32AB1, and the fourth auxiliary plate 32BB1 are screwed to an inner side of the rightward body frame 20 at an upper position with screws 50 from outside toward inside of the rightward body frame 20. As such, the scanner frame 30 is attached to both the leftward body frame 10 and the rightward body frame 20 in the same direction, i.e., from the outer side toward the inside. Therefore, working efficiency of a worker for assembling the framework may be improved. Moreover, the leftward wall plate 32C, the first auxiliary plate 32AA1, and the third auxiliary plate 32BA are screwed to the leftward body frame 10, and the rightward wall plate 32D, the second auxiliary plate 32AB1, and the fourth auxiliary plate 32BB1 are screwed to the rightward body frame 20. Thereby, overall rigidity of the printer 1 against a force in the horizontal direction may be improved with the scanner frame 30. Moreover, the first auxiliary plate 32AA1, the second auxiliary plate 32AB1, the third auxiliary plate 32BA1, and the fourth auxiliary plate 32BB1 are accommodated in an area inside the wall plates 32 without jutting outward; therefore, the scanner frame 30 as a whole may be provided in a compact shape.

Figure 6:
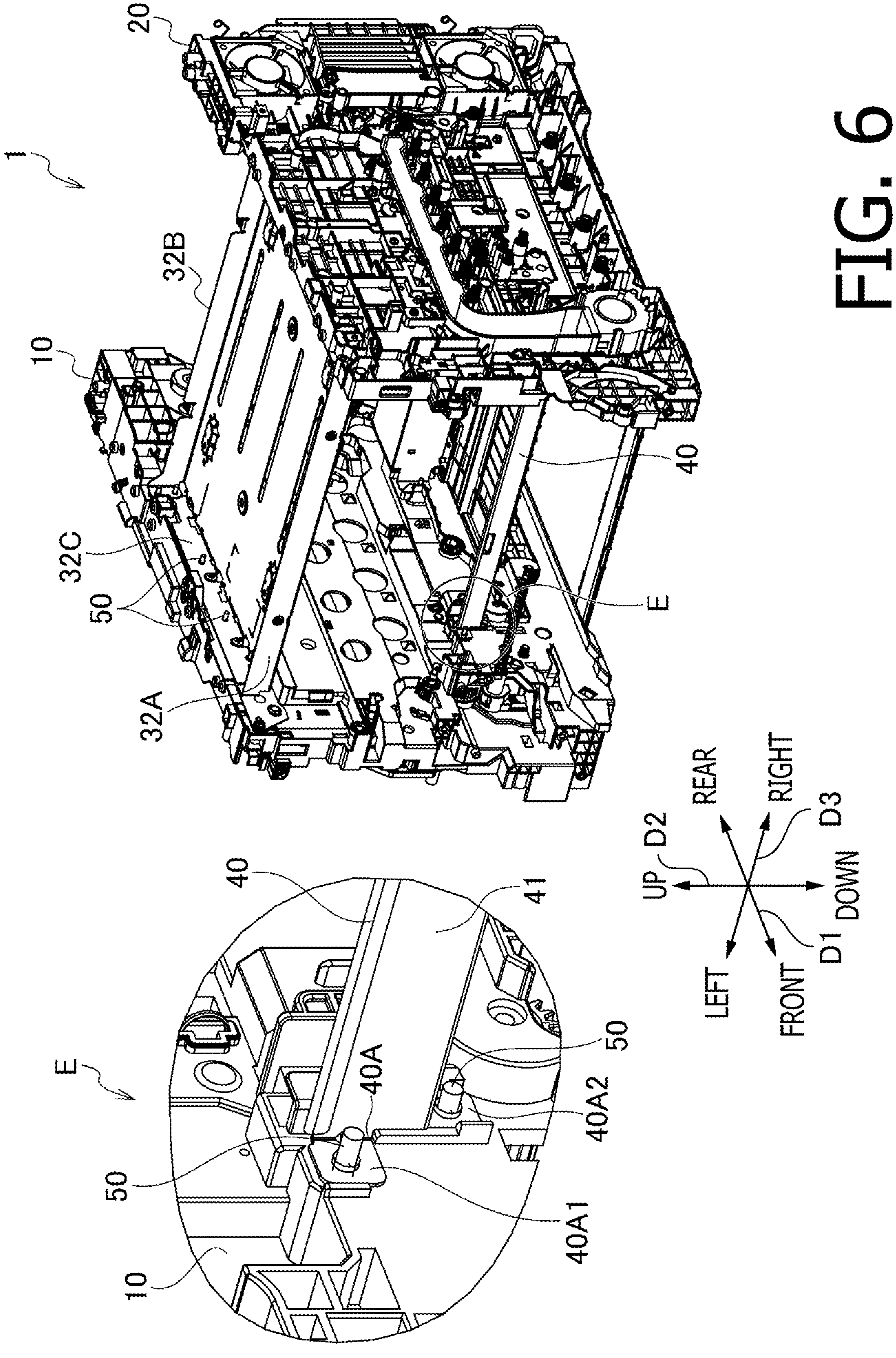
FIG. 6 is a perspective view and an enlarged view of an area E of the inner frames of the color laser printer.

FIG. 6 shows a perspective view of the inner frames of the color laser printer 1 and an enlarged view of an area E, in which a leftward edge portion 40A of the enhancing frame 40 is located. As shown in FIG. 6, the enhancing frame 40 includes an enhancing-frame body 41, which extends between the leftward body frame 10 and the rightward body frame 20. The enhancing frame 40 further includes fifth auxiliary plates 40A1, 40A2, which are bent to extend in parallel to the leftward body frame 10 from a leftward edge portion 40A of the enhancing-frame body 41. The fifth auxiliary plate 40A1, which is one of the fifth auxiliary plates 40A1, 40A2, is bent frontward along the front-rear direction D1 from the leftward edge portion 40A, and the fifth auxiliary plate 40A2, which is the other of the fifth auxiliary plates 40A1, 40A2, is bent downward along the up-down direction D2 from the leftward edge portion 40A. The leftward edge portion 40A is an example of an edge portion of the enhancing-frame body on the side toward the one of the paired main-body frames.

Figure 7:
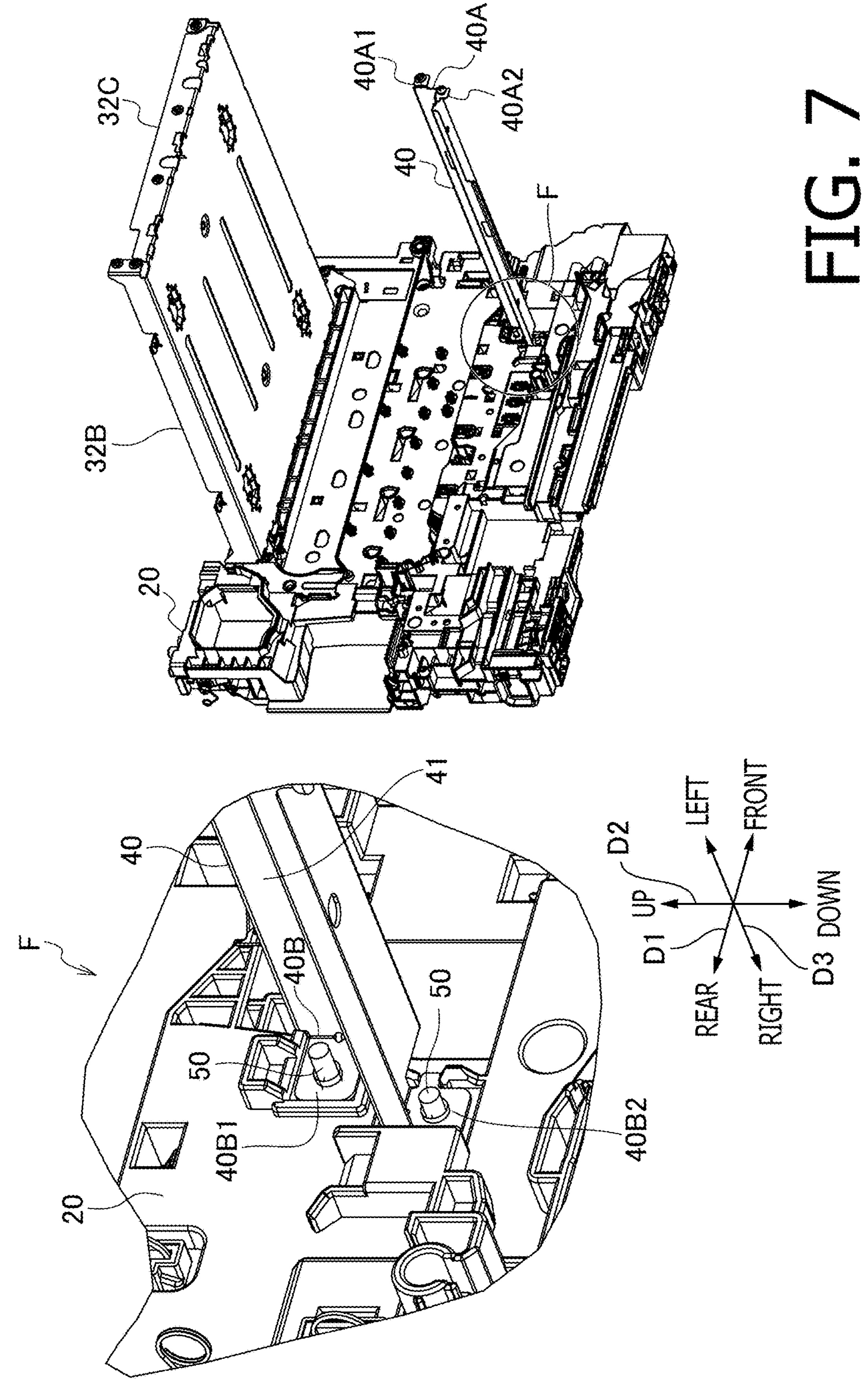
FIG. 7 is a perspective view and an enlarged view of an area F of the inner frames of the color laser printer.

FIG. 7 shows a perspective view of the inner frames of the color laser printer 1 and an enlarged view of an area F, in which a rightward edge portion 40B of the enhancing frame 40 is located. As shown in FIG. 7, the enhancing frame 40 further includes sixth auxiliary plates 40B1, 40B2, which are bent to extend in parallel to the rightward body frame 20 from a rightward edge portion 40B of the enhancing-frame body 41. The sixth auxiliary plate 40B1, which is one of the sixth auxiliary plates 40B1, 40B2, is bent rearward along the front-rear direction D1 from the rightward edge portion 40B, and the sixth auxiliary plate 40B2, which is the other of the sixth auxiliary plates 40B1, 40B2, is bent downward along the up-down direction D2 from the rightward edge portion 40B. It may be noted that the sixth auxiliary plate 40B1 and the fifth auxiliary plate 40A1 are bent in opposite directions in consideration of the locations of the attachment. The rightward edge portion 40B is an example of another edge portion of the enhancing-frame body on the side toward the other of the paired main-body frames.

For attaching the enhancing frame 40 to the main-body frames 10, 20 to extend between the leftward body frame 10 and the rightward body frame 20, the fifth auxiliary plates 40A1, 40A2 are screwed to the inner side of the leftward body frame 10 at a lower position with screws 50 from outside toward inside of the leftward body frame 10, and the sixth auxiliary plate 40B1, 40B2 are screwed to the inner side of the rightward body frame 20 at a lower position with screws 50 from outside toward inside of the rightward body frame 20. As such, similarly to attachment of the scanner frame 30 to the leftward body frame 10 and the rightward body frame 20, the enhancing frame 40 is attached to both the leftward body frame 10 and the rightward body frame 20 in the same direction, i.e., from the outer side toward the inside. Therefore, working efficiency of the worker for assembling the framework may be improved. Moreover, with the enhancing frame 40 screwed to the leftward body frame 10 and the rightward body frame 20, overall rigidity of the printer 1 against a force in the horizontal direction may be improved even more.

As explained above, the printer 1 according to the embodiment of the present disclosure includes the paired main-body frames 10, 20, forming side walls of the main body that face each other, and the scanner frame 30, on which the exposure device for irradiating the photosensitive drums is mounted. The scanner frame 30 is connected to the leftward body frame 10 being one of the paired main-body frames 10, 20 and the rightward body frame 20 being the other of the paired main-body frame 10, 20 at a position between the leftward body frame 10 and the rightward body frame 20.

The scanner frame 30 includes the bottom plate 31, the leftward wall plate 32C, the rightward wall plate 32D, the frontward wall plate 32A, the rearward wall plate 32B, the first auxiliary plate 32AA1, the second auxiliary plate 32AB1, the third auxiliary plate 32BA1, and the fourth auxiliary plate 32BB1. The bottom plate 31 extends in the horizontal direction between the leftward body frame 10 and the rightward body frame 20 and includes the leftward edge portion 31C located on the side toward the leftward body frame 10, the rightward edge portion 31D located on the side toward the rightward body frame 20, the frontward edge portion 31A joining the leftward edge portion 31C and the rightward edge portion 31D, and the rearward edge portion 31B located on the side opposite to the rightward edge portion 31D. The leftward wall plate 32C extends in the vertical direction from the leftward edge portion 31C of the bottom plate 31. The rightward wall plate 32D extends in the vertical direction from the rightward edge portion 31D of the bottom plate 31. The frontward wall plate 32A extends in the vertical direction from the frontward edge portion 31A of the bottom plate 31. The rearward wall plate 32B extends in the vertical direction from the rearward edge portion 31B of the bottom plate 31. The first auxiliary plate 32AA1 is formed by being bent to extend in parallel to the leftward wall plate 32C from the leftward edge portion 32AA of the frontward wall plate 32A. The second auxiliary plate 32AB1 is formed by being bent to extend in parallel to the rightward wall plate 32D from the rightward edge portion 32AB of the frontward wall plate 32A. The third auxiliary plate 32BA1 is formed by being bent to extend in parallel to the leftward wall plate 32C from the leftward edge portion 32BA of the rearward wall plate 32B. The fourth auxiliary plate 32BB1 is formed by being bent to extend in parallel to the rightward wall plate 32D from the rightward edge portion 32BB of the rearward wall plate 32B.

The leftward wall plate 32C, the first auxiliary plate 32AA1, and the third auxiliary plate 32BA are screwed to the leftward body frame 10. The rightward wall plate 32D, the second auxiliary plate 32AB1, and the fourth auxiliary plate 32BB1 are screwed to the rightward body frame 20.

As such, in the printer 1 according to the embodiment of the present disclosure, the leftward wall plate 32C, the first auxiliary plate 32AA1, and the third auxiliary plate 32BA1 are screwed to the leftward body frame 10, and the rightward wall plate 32D, the second auxiliary plate 32AB1, and the fourth auxiliary plate 32BB1 are screwed to the rightward body frame 20; therefore, the entire printer 1 may be enhanced against the force in the horizontal direction. Accordingly, even if the printer 1 employs a less rigid scanner frame 30, strength of the printer 1 against the force in the horizontal direction may be improved.

Moreover, the first auxiliary plate 32AA1 is bent toward the leftward wall plate 32C, and the second auxiliary plate 32AB1 is bent toward the rightward wall plate 32D. Therefore, the locations where the scanner frame 30 occupies on the main-body frames 10, 20 may be reduced into compact areas.

Moreover, the third auxiliary plate 32BA1 is bent toward the leftward wall plate 32C, and the fourth auxiliary plate 32BB1 is bent toward the rightward wall plate 32D. Therefore, the locations where the scanner frame 30 occupies on the main-body frames 10, 20 may be reduced into compact areas.

Moreover, the leftward wall plate 32C, the first auxiliary plate 32AA1, and the third auxiliary plate 32BA1 are screwed to the leftward body frame 10 from the outer side of the leftward body frame 10, and the rightward wall plate 32D, the second auxiliary plate 32AB1, and the fourth auxiliary plate 32BB1 are screwed to the rightward body frame 20 from the outer side of the rightward body frame 20. As such, the screws 50 on each side are inserted from the same outer side. Therefore, working efficiency of the worker to attach the scanner frame 30 to each of the leftward body frame 10 and the rightward body frame 20 may be improved.

The printer 1 according to the embodiment of the present disclosure further includes the enhancing frame 40 connected to the leftward body frame 10 and the rightward body frame 20 at the position between the leftward body frame 10 and the rightward body frame 20. The enhancing frame 40 includes the enhancing-frame body 41, the fifth auxiliary plates 40A1, 40A2, and the sixth auxiliary plates 40B1, 40B2. The enhancing-frame body 41 extends between the leftward body frame 10 and the rightward body frame 20. The fifth auxiliary plates 40A1, 40A2 are formed by being bent to extend in parallel to the leftward body frame 10 from the leftward edge portion 40A of the enhancing-frame body 41. The sixth auxiliary plates 40B1, 40B2 are formed by being bent to extend in parallel to the rightward body frame 20 from the rightward edge portion 40B of the enhancing-frame body 41. The fifth auxiliary plates 40A1, 40A2 are screwed to the leftward body frame 10 from the outer side of the leftward body frame 10, and the sixth auxiliary plates 40B1, 40B2 are screwed to the rightward body frame 20 from the outer side of the rightward body frame 20.

As such, the printer 1 is provided with the enhancing frame 40; therefore, the entire printer 1 may be enhanced against the force in the horizontal direction. Moreover, screwing with the screws 50 is performed in the same directions; therefore, working efficiency of the worker to attach the enhancing frame 40 to each of the leftward body frame 10 and the rightward body frame 20 may be improved.

While the invention has been described in conjunction with various example structure outlined above and illustrated in the figures, various alternatives, modifications, variations, improvements, and/or substantial equivalents, whether known or that may be presently unforeseen, may become apparent to those having at least ordinary skill in the art. Accordingly, the example embodiment of the disclosure, as set forth above, is intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

For example, the image forming apparatus in the present disclosure may not necessarily be limited to the color laser printer 1 but may be a monochrome laser printer. For another example, the image forming apparatus may not necessarily be limited to the single-functioned printer but may be a multifunction peripheral machine with a facsimile-communication function or may be a copier.

For another example, in the embodiment described above, the first auxiliary plate 32AA1 and the leftward body frame 10 are screwed with one screw 50, the third auxiliary plate 32BA1 and the leftward body frame 10 are screwed with two screws 50. Moreover, the second auxiliary plate 32AB1 and the rightward body frame 20 are screwed with one screw 50, and the fourth auxiliary plate 32BB1 and the rightward body frame 20 are screwed with two screws 50. However, the number of the screws 50 is not necessarily limited to those described above but may be selected optionally in consideration of various factors including an overall manufacturing cost of the printer 1 and attachable ranges of the scanner frame 30 and the enhancing frame 40 within the framework.

What is claimed is:

1. An image forming apparatus, comprising:

paired main-body frames forming side walls of a main body that face each other; and a scanner frame, on which an exposure device for irradiating a photosensitive drum is mounted, the scanner frame being connected to one of the paired main-body frames and the other of the paired main-body frames at a position between the one of the paired main-body frames and the other of the paired main-body frames, the scanner frame including:

a bottom plate extending in a horizontal direction between the one of the paired main-body frames and the other of the paired main-body frames, the bottom plate including a first edge portion located on a side toward the one of the paired main-body frames, a second edge portion located on a side toward the other of the paired main-body frames, a third edge portion joining the first edge portion and the second edge portion, and a fourth edge portion located on a side opposite to the third edge portion;

a first wall plate extending in a vertical direction from the first edge portion of the bottom plate;

a second wall plate extending in the vertical direction from the second edge portion of the bottom plate;

a third wall plate extending in the vertical direction from the third edge portion of the bottom plate;

a fourth wall plate extending in the vertical direction from the fourth edge portion of the bottom plate;

a first auxiliary plate formed by being bent to extend in parallel to the first wall plate from an edge portion of the third wall plate on the side toward the one of the paired main-body frames;

a second auxiliary plate formed by being bent to extend in parallel to the second wall plate from an edge portion of the third wall plate on the side toward the other of the paired main-body frames;

a third auxiliary plate formed by being bent to extend in parallel to the first wall plate from an edge portion of the fourth wall plate on the side toward the one of the paired main-body frames; and a fourth auxiliary plate formed by being bent to extend in parallel to the second wall plate from an edge portion of the fourth wall plate on the side toward the other of the paired main-body frames, wherein the scanner frame is attached to the one of the paired main-body frames with at least one screw commonly threadedly engaged with the one of the paired main-body frames, the first wall plate, and the first auxiliary plate, and with at least one screw commonly threadedly engaged with the one of the paired main-body frames, the first wall plate, and the third auxiliary plate, and the scanner frame is attached to the other of the paired main-body frames with at least one screw commonly threadedly engaged with the other of the paired main-body frames, the second wall plate, and the second auxiliary plate, and with at least one screw commonly threadedly engaged with the other of the paired main-body frames, the second wall plate, and the fourth auxiliary plate.

2. The image forming apparatus according to claim 1, wherein the first auxiliary plate extends along the first wall plate toward the third auxiliary plate, and the second auxiliary plate extends along the second wall plate toward the fourth auxiliary plate.

3. The image forming apparatus according to claim 1, wherein the third auxiliary plate extends along the first wall plate toward the first auxiliary plate, and the fourth auxiliary plate extends along the second wall plate toward the second auxiliary plate.

4. The image forming apparatus according to claim 1, wherein the at least one screw commonly threadedly engaged with the one of the paired main-body frames, the first wall plate, and the first auxiliary plate, and the at least one screw commonly threadedly engaged with the one of the paired main-body frames, the first wall plate, and the third auxiliary plate are arranged to extend from an outer side toward an inner side of the one of the paired main-body frames, and the at least one screw commonly threadedly engaged with the other of the paired main-body frames, the second wall plate, and the second auxiliary plate, and the at least one screw commonly threadedly engaged with the other of the paired main-body frames, the second wall plate, and the fourth auxiliary plate are arranged to extend from an outer side toward an inner side of the other of the paired main-body frames.

5. The image forming apparatus according to claim 4, further comprising an enhancing frame connected to the one of the paired main-body frames and the other of the paired main-body frames at a position between the one of the paired main-body frames and the other of the paired main-body frames, the enhancing frame including:

an enhancing-frame body extending between the one of the paired main-body frames and the other of the paired main-body frames;

a fifth auxiliary plate formed by being bent to extend in parallel to the one of the paired main-body frames from an edge portion of the enhancing-frame body on the side toward the one of the paired main-body frames; and a sixth auxiliary plate formed by being bent to extend in parallel to the other of the paired main-body frames from an edge portion of the enhancing-frame body on the side toward the other of the paired main-body frames, wherein the enhancing frame is attached to the one of the paired main-body frames with at least one screw threadedly engaged with the one of the paired main-body frames and the fifth auxiliary plate from an outer side toward an inner side of the one of the paired main-body frames, and the enhancing frame is attached to the other of the paired main-body frames with at least one screw threadedly engaged with the other of the paired main-body frames and the sixth auxiliary plate from an outer side toward an inner side of the other of the paired main-body frames.

* * * * *